United States Patent [19]

Carter et al.

[11] Patent Number: 4,933,558

[45] Date of Patent: Jun. 12, 1990

[54] X-RAY SENSITIVE AREA DETECTION DEVICE

[75] Inventors: Daniel C. Carter; William K. Witherow; Marc L. Pusey; Vaughn H. Yost, all of Huntsville, Ala.

[73] Assignee: The United States of America as represented by the Administrator of the National Aeronautics and Space Administration, Washington, D.C.

[21] Appl. No.: 304,155

[22] Filed: Jan. 31, 1989

[51] Int. Cl.[5] .................. G01N 23/20; H05B 33/00
[52] U.S. Cl. ............................. 250/327.2; 250/484.1
[58] Field of Search ............... 250/327.2 C, 327.2 D, 250/327.2 L, 484.1 B

[56] References Cited

U.S. PATENT DOCUMENTS

| | | | |
|---|---|---|---|
| 4,578,581 | 3/1986 | Tanaka et al. | 250/484.1 B |
| 4,598,207 | 7/1986 | Naruse et al. | 250/484.1 B |
| 4,803,359 | 2/1989 | Hosoi et al. | 250/484.1 B |
| 4,814,616 | 3/1989 | Saotome | 250/484.1 B |
| 4,835,398 | 5/1989 | Nakamura | 250/484.1 B |

FOREIGN PATENT DOCUMENTS 0015843  1/1984  Japan ............................ 250/327.2 C

OTHER PUBLICATIONS

Amemiya et al, "Imaging Plate for Time-Resolve X-ray Measure", Rev. Sci. Instrum, 60(7), Jul. 1989.

*Primary Examiner*—Janice A. Howell
*Assistant Examiner*—Richard Hanig
*Attorney, Agent, or Firm*—William J. Sheehan; John R. Manning; Jerry L. Seemann

[57] ABSTRACT

A radiation sensitive area detection device is disclosed which comprises a phosphor-containing film capable of receiving and storing an image formed by a pattern of incoming X-rays, UV, or other radiation falling on the film and capable of fluorescing in response to stimulation by a light source in a manner directly proportional to the stored radiation pattern; a light source capable of projecting light or other appropriate electromagnetic wave on the film so as to cause it to fluoresce; means, such as a lens, to focus the fluoresced light coming from the phosphor-containing film after light stimulation; and at least one charged coupled detector or other detecting element capable of receiving and digitizing the pattern of fluoresced light coming from the phosphor-containing film. The device of the present invention will be able to generate superior X-ray images of high resolution from a crystal or other sample, and will be particularly advantageous in that instantaneous near real time images of rapidly deteriorating samples can be obtained. Further, the device can be made compact and sturdy, thus capable of carrying out X-ray or other radiation imaging under a variety of conditions, including those experienced in space.

39 Claims, 7 Drawing Sheets

X-RAY SENSITIVE AREA DETECTION DEVICE

ORIGIN OF THE INVENTION

The invention described herein was made by employees of the United States Government and may be manufactured and used by or for the Government for governmental purposes without the payment of any royalties thereon or therefor.

FIELD OF THE INVENTION

The invention relates to an X-ray or other radiation sensitive area detection device of high spatial resolution which uses a phosphor-containing film to store an X-ray image and transmit that image to a detecting element when stimulated with light or other appropriate electromagnetic wave.

BACKGROUND OF THE INVENTION

Area detector systems are invaluable tools for experimentation and research in a wide variety of scientific and medical endeavors. Over the years, these detectors have been used as analytical and diagnostic devices in such diverse fields as crystallography, medical radiography, electron microscopy, biophysics, and astronomy. Earlier area detection devices were of two general types: (1) the multiwire proportional counters (such as described in Bateman et al, *Nuc. Inst. Meth. Phvs. Res.* A259: 506–520 (1987)) and (2) TV detectors (see, e.g., Kalata, *Methods in Enzymology* 114: 486–510 (1985)). Although devices of these two types are still used successfully in particular applications, they suffer from several drawbacks. In particular, these devices generally are limited in active area and spatial resolution, experience high levels of spatial distortion and nonuniformity of response, and require a prolonged exposure to X-rays in order to develop a satisfactory picture. In cases where an instantaneous image of a rapidly deteriorating sample is required, these prior art systems are not rapid enough to provide near real time images, and thus are not suitable for these applications. One example of where almost instantaneous imaging is necessary is the field of protein crystallography. Protein single crystals are grown so that the three dimensional structure of the protein can be determined by X-ray diffraction. Typically, these grown protein crystals deteriorate very rapidly with both time and handling, and the specific details of the protein structure will be lost if an X-ray pattern from the crystals cannot be obtained within a short period after their formation. It is thus necessary to develop a system for area detection which has rapid data acquisition, and which can thus provide near real time imaging capabilities for X-ray patterns.

A recent discovery of the unique properties of particular phosphor-containing films has enabled new developments in X-ray and UV-sensitive area detection devices. It has been found that a plate containing barium fluorohalide (BaFX:Eu) crystals will absorb a particular fraction of incident X-ray or UV radiation by "trapping" an electron in a halogen ion vacancy or "F-center". Electrons so trapped will normally be stored at a half life of approximately 10 hours. However, if the film is irradiated with visible light, the electrons trapped in the F-center will be liberated to the conduction band leading to the formation of $Eu^{+2}$ ions in an excited state. These excited ions then relax to give off luminescence proportional in intensity to the X-ray or UV irradiation originally absorbed. It is thus possible using such phosphor-containing films to create a stored or "latent image" on the film which can almost immediately be "dumped" or transmitted by subsequent illumination with light or other electromagnetic wave at an appropriate wavelength. After such "dumping" of the image, the phosphor film returns to its original state and can be reused for further X-ray imaging.

One device incorporating such a phosphor film has been constructed, and is described in Miyahara et al, *Nuc. Inst. Meth. Phvs. Res.* A246: 572–578 (1986). This device essentially consists of a $BaFBr:Eu^{2+}$ phosphor screen imaging plate, a laser beam reflected by a scanning mirror, a light guide, which collects the photostimulated luminescent radiation, and a photomultiplier tube into which the collected light is channeled. In this setup, a He-Ne laser beam emitting light at 632.8 nm is used to illuminate the film, which luminesces at around 390 nm in response to the laser. This system, however, also suffers from certain drawbacks such as its ability to only scan line by line, as opposed to additionally being able to scan an entire area at once, and its use of complex photomultiplier tubes which limit the resolution and reliability of the system. Further, the complex and sensitive components necessary for this system limit the ability to make the system compact and durable, as would be required for X-ray detection devices used in protein crystallization studies carried out in space or in other zero-gravity environments. What is desired, therefore, is an X-ray or UV-sensitive detection device which can be made from simple, commercially available components, which can successfully employ phosphor-containing films to create near real time images of rapidly deteriorating sample with high spatial resolution, and which can also be made into a compact and rugged unit suitable for carrying out X-ray imaging under a variety of conditions.

SUMMARY OF THE INVENTION

An X-ray sensitive area detection device for use in conjunction with an X-ray, UV, or other radiation source is provided by the present invention which comprises:

a phosphor-containing film capable of receiving and storing an image formed by the pattern of X-rays, UV, or other incoming radiation falling on the film, and capable of fluorescing in response to the stimulation of the film by light at an appropriate wavelength, the fluorescence of the film being in direct proportion to the pattern of incoming radiation which had originally formed an image on the film;

a light source capable of projecting light or other electromagnetic wave upon the phosphor-containing film so that it fluoresces in direct proportion to the pattern of incoming radiation falling on the film so as to transmit the stored image of that pattern to a detecting device;

means for focusing the fluoresced light coming from the phosphor-containing film after light stimulation so that the fluoresced light can be received by a detecting element; and a detecting element, such as a charged coupled detector, capable of receiving and digitizing the fluoresced light coming from the phosphor-containing film after light stimulation so as to allow detection of the pattern of incoming radiation which had originally formed an image on the film.

By the focusing of the fluoresced light via a lens or other suitable focussing means, the distances involved in generating the X-ray image, from X-ray source to sample to film and then to the detector, is much reduced when compared to prior models using phosphor-containing image films. As a result, the detection device of the present invention can be made compact, yet still reliably provide almost instantaneous X-ray images of high spatial resolution. Further, the device of the invention can be made from simple, commercially available components, and will be suitable for carrying out X-ray imaging under a variety of conditions.

DETAILED DESCRIPTION OF THE PREFERRED EMBODIMENTS

Figure 1:
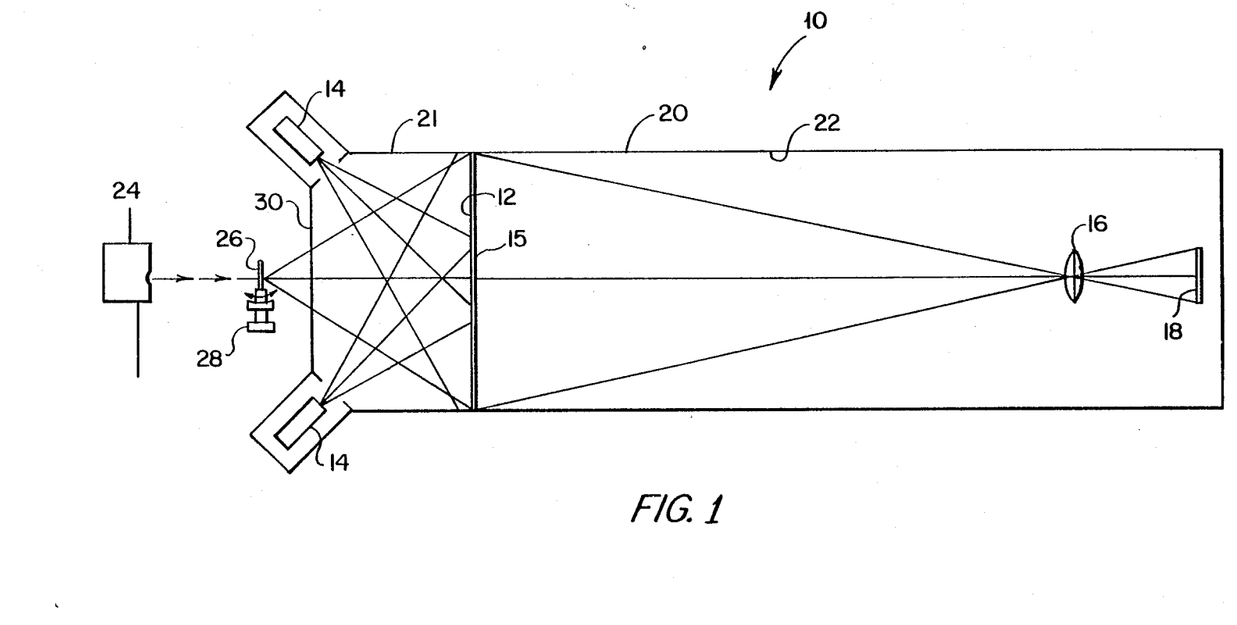
FIG. 1 is a top view of a transmission area-scanning embodiment of the present invention.

An embodiment for carrying out X-ray, UV, or other radiation area scanning in accordance with the present invention can be observed in FIG. 1. The radiation area detection device 10 consists of a phosphor-containing film or plate 12, a light source 14, a focusing means comprising lens 16, and a detecting element, such as charged coupled detector (or CCD) 18 upon which fluoresced light from the stimulated phosphor-containing film is focused. By light source, it is indicated that a source of light or other electromagnetic wave is provided which is capable of projecting an electromagnetic wave at an appropriate wave length upon the phosphor-containing film so as to cause it to fluoresce. It is preferred that a charged coupled detector be employed as the detecting element in the present invention in order to maximize resolution. However, other suitable detecting elements, such as a two-dimensional image intensifier, a photomultiplier tube, photodiodes or other light-sensitive materials, may also be employed in the present invention.

In the embodiment shown in FIG. 1, the components are housed in a light box 20 which, at the end 21 adjacent the light source 14 (on the same side of the phosphor film as the light source), has a reflective interior surface so as to increase the amount of light projected onto the phosphor film. At the inner region 22 of light box 20, the box is coated on its interior by dark or flat black paint so as to be opaque to visible light. A source for providing X-rays or other radiation to the detector is shown as element 24, and the radiation is directed to pass through a sample chamber 26 (such as a capillary tube) containing a crystal or other object to be studied. The chamber 26 is situated on a conventional goniometer 28 or "crystal positioner" (such as those manufactured by Huber), which can ensure a 360° rotation of the chamber and produce an X-ray diffraction pattern from the crystal upon the phosphor-containing screen 12. As in the embodiment depicted in FIG. 1, it is preferred that a window 30 be positioned between the sample chamber 26 and the phosphor film plate 12 so that X-ray radiation only will be received by the film plate when X-rays are applied to the sample chamber. This window 30 should be of such a material (such as beryllium) which is transparent to X-rays, but opaque to both visible (400–700 nm) and infrared (700–1400 nm) light.

When it is desired to take an area scan to produce a diffraction image of a particular crystal, the apparatus of the present invention is operated by irradiating the phosphor-containing film plate 12 with X-rays or other radiation deflected or transmitted through the atoms of a crystal in chamber 26. This incoming radiation will be absorbed by the phosphor film so as to retain a latent image of the crystal's diffraction pattern. It has been found that films containing barium fluorohalide crystals as the phosphor will be suitable for use in the present invention. In particular, films or plates containing a $BaFBr:Eu^{2+}$ photostimulable phosphor have been successfully employed in the inv Other barium fluorohalide crystals such as BaFCl also been suitable for use as phosphors in the present apparatus. Still other phosphors, such as lanthanum-based compounds (e.g., LaOBr) and salts such as sodium iodide (possibly doped with valium) can also be employed in films used in the invention.

In order to allow "dumping" of the latent image stored by the phosphor film, it is necessary to illuminate the film with a suitable source of light or other appropriate electromagnetic wave. It has been determined that a light source of approximately 1060 nm light is particularly preferred for stimulating the phosphor film so that fluorescence of the latent image will occur at about 560 nm. By using a source of 1060 nm light to illuminate the phosphor film, a clear, precise image having high spatial resolution can be directed onto the charged coupled detector element 18, and this image will be directly proportional to the X-ray diffraction pattern image originally formed on the phosphor screen. The irradiation of phosphor screen 12 by 1060 nm light not only causes fluorescence in proportion to the trapped X-ray radiation, but simultaneously "clears" or erases the stored image (as the phosphor returns to its original state) so that the film becomes automatically ready for a new "latent image". It is also possible to direct He-Ne laser light at the phosphor screen so that the stored image is released, and this light will cause the phosphor film to fluoresce at a wavelength of approximately 400 nm.

In the preferred embodiment, the phosphor-containing film fluoresces at 560 nm, and it is contemplated that the phosphor be deposited on a band-pass filter 15 which restricts the transmission of light to the 400–600 nm region. The band-pass filter 15 is preferably made of glass, but any other filter with similar optical properties, such as plastic, crystals, or other transparent materials, may also be utilized. The fluorescent 560 nm light that is produced by the illumination of the phosphor with 1060 nm light will thus be allowed to pass through filter 15 and be detected by the CCD 18. In the embodiment of FIG. 1, a lens 16 (which can be comprised of any suitable transparent material such as glass or plastic) is chosen which is suitable for focusing 560 nm light on the charged coupled detector 18. It has been estimated that a detector of the invention of 14 inches in length can be constructed having a one-inch square CCD, and a suitable lens used in this system would have a focal length of about 1.39 inches and a diameter of 1.16 inches (f=1.2). This lens should be disposed approximately 1.67 inches in front of the CCD, and about 8.33 inches behind the phosphor screen (about a 5×5 inch square). Two 1060 nm light sources can be used, and these would be situated approximately 3 inches in front of the phosphor screen. With this apparatus, the crystal being examined could be placed about four inches away from the phosphor screen with successful rapid imaging results.

Figure 2:
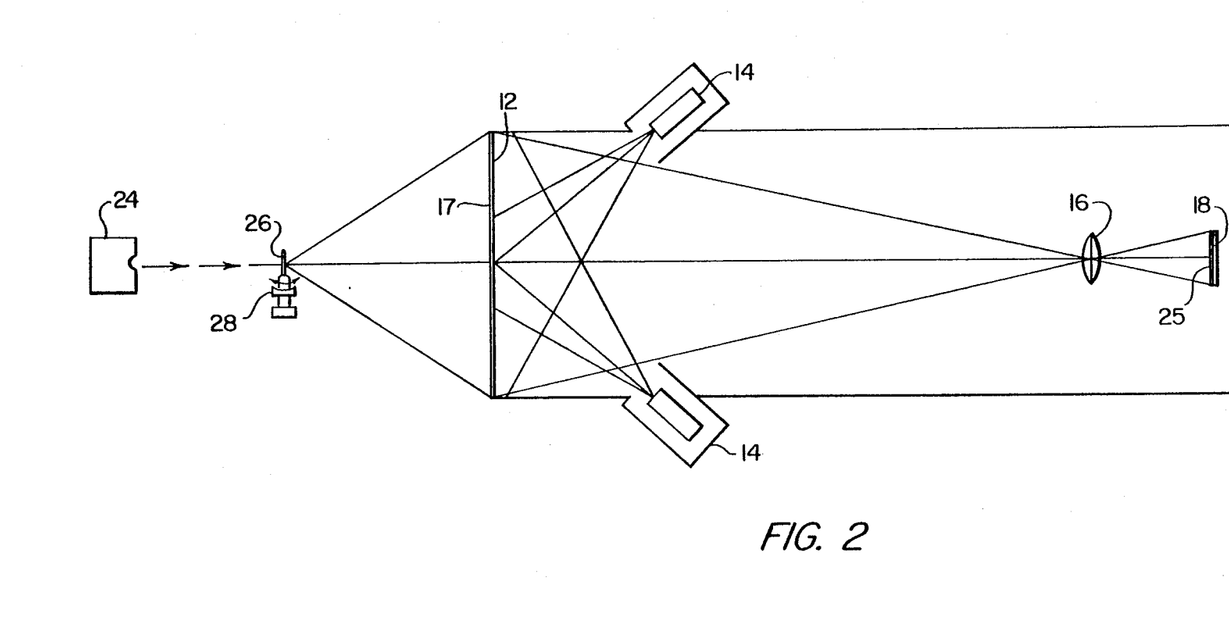
FIG. 2 is a top view of a reflection area-scanning embodiment of the present invention.

In the FIG. 1 embodiment, it can be observed that the light source 14 is on the opposite side of the phosphor screen 12 from the CCD 18. This is known as a transmission embodiment. It is also possible to provide an apparatus wherein the light source is on the same side of screen 12 as the detector 18. In such a configuration or "reflection" embodiment, as shown in FIG. 2, a beryllium window 17 replaces the band-pass filter 15 of FIG. 1, and the phosphor film or coating 12 is placed on the side of window 17 facing the CCD 18. In addition, a glass band-pass filter 25 will be placed on the coupled charged detector 18.

Figures 3, 4:
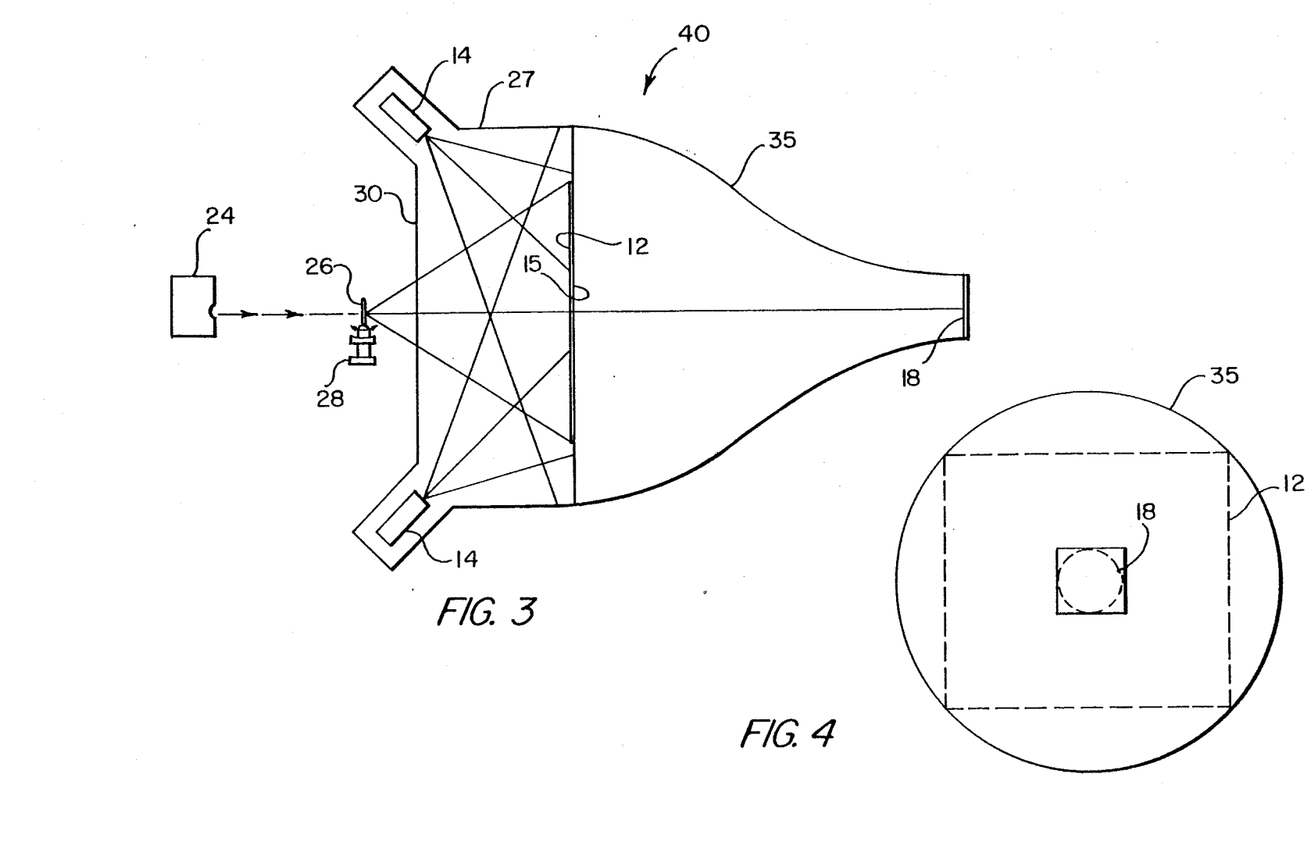
FIG. 3 is a top view of an alternative embodiment of FIG. 1.
FIG. 4 is a side view of FIG. 3.

Another preferred embodiment which can carry out area scan imaging is observed in FIGS. 3 and 4. In this embodiment 40, there is no lens employed, and light is focused upon CCD 18 by means of an optical fiber bundle 35 which is formed in the shape of one-half of an hourglass (hereinafter referred to as hourglass). As observed in FIG. 3, and as is the case in the transmission embodiment of FIG. 1, this detection device has a pair of light sources 14 on the side opposite the phosphor screen 12 from the CCD 18. The phosphor in this case is deposited on band-pass filter 15 on the side of the filter facing light source 14. The apparatus 40 will also contain cylindrical light box 27 adjacent the light sources 14 which has an interior surface capable of reflecting light, particularly at the 1060 nm wavelength. It is also desirable to position beryllium window 30 between the sample chamber 26 and the phosphor layer 12.

The optical fiber bundle 35 with its hourglass shape is especially useful in focusing the fluoresced light upon the CCD in order to obtain an image of extremely high resolution. The detecting power of the apparatus 40 will be less affected by the distorting effects of the scattering of fluoresced light which can lower overall resolution of the image under certain conditions. The major reason for the high resolution possible in this embodiment is the inherent characteristic of optical fibers known as the minimum acceptance angle of light. In addition to providing better resolution of images with lower distortion, the fiber bundle as observed in FIG. 3 permits the apparatus to be made more compactly, as would be needed, for example, for X-ray detection experiments carried out in a space station or other areas where space is limited. Finally, the hourglass-shaped fiber optics bundle intensifies the fluoresced image by the ratio of the large end to the small end diameter, and thus by properly choosing the dimensions of the bundle fluoresced light intensity is maximized. It is contemplated that the optical fiber bundle will be a minimum of about 7 inches in diameter at the end abutting the filter 15, and about 1 inch in diameter at the end adjacent to the CCD 18. This setup will also have a 5 inch by 5 inch square band-pass filter 15 with deposited phosphor film 12, and a roughly one inch by one inch square CCD detecting screen.

Figure 5:
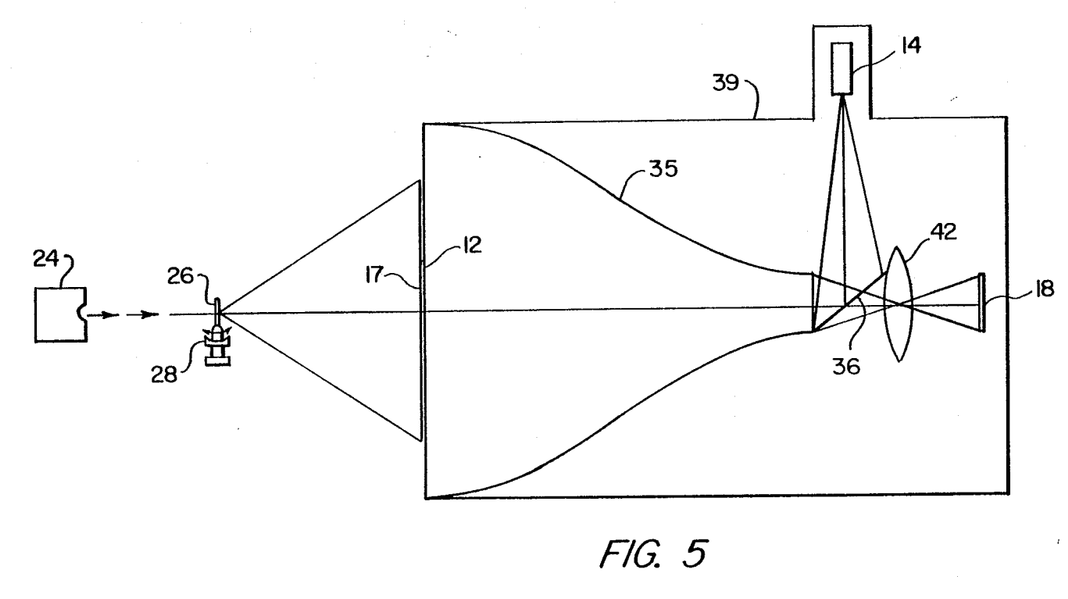
FIG. 5 is a top view of an alternative embodiment of FIG. 2.

A reflection embodiment for carrying out area scanning can also be constructed in accordance with the present invention having an hourglass-shaped optical fiber bundle. In this configuration, as observed in FIG. 5, it is preferred that the light source 14 be situated so as to project light upon an infrared mirror 36, which can reflect 1060 nm light to the phosphor layer 12 on the side of beryllium metal window 17 nearest the CCD 18. The mirror 36 will be disposed in front of CCD 18, and thus will need to be transparent to the fluorescent light (at about the 560 nm wavelength) coming from the phosphor screen. The mirror 36 thus preferably reflects infrared light, yet will be transparent to visible light. This reflection embodiment should be housed in light box 39, which is cylindrically shaped to surround the optical fiber bundle 35, and is coated in its interior with flat black paint opaque to 400 to 1400 nm light. It is preferred that a lens 42 also be employed in the configuration shown in FIG. 5 in order to further focus the fluoresced light upon CCD 18 and enhance resolution.

Figure 6:
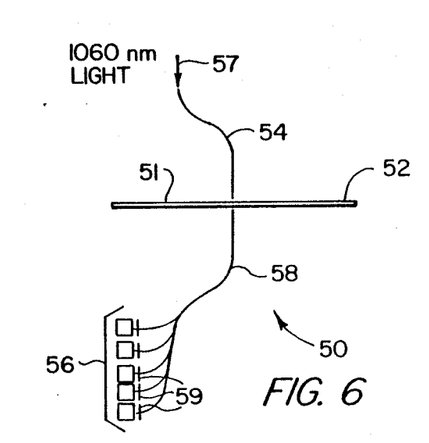
FIG. 6 is a top view of a transmission line-scanning embodiment of the present invention.
Figure 7:
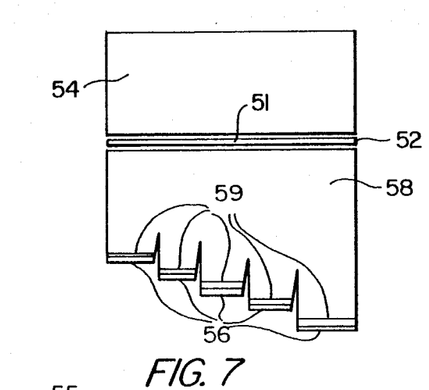
FIG. 7 is a side view of FIG. 6.

In the previously described embodiments, the X-ray pattern formed on the phosphor film was transmitted to the CCD all at once, as is the case with the area scan modes of the present invention. However, it is also possible to construct an apparatus in accordance with the invention which can carry out line by line scanning of the X-ray pattern when so desired. One such embodiment can be observed in FIGS. 6 and 7. In this apparatus 50, light 57 is projected upon phosphor screen 52 (after it has received and stored an X-ray image pattern) by means of a projecting fiber optic sheet 54 which is disposed on the opposite side of screen 52 from an array 56 of CCD's. In this embodiment, an array 56 is shown to be comprised of a plurality of detecting elements. The phosphor layer 51 will be on the side of the phosphor screen facing fiber optic sheet 54. Directly across the projecting fiber optic sheet 54 will be a receiving fiber optic sheet 58 which receives fluoresced light from screen 52 after illumination, and focuses that fluoresced light upon the array 56 of CCD's. In the embodiment shown in FIGS. 6 and 7, the receiving flexible fiber optics sheet 58 is split at the ends approaching CCD array 56, and sheet 58 is attached to the array which consists of five individual CCD's to maximize resolution of the image. A greater or lesser number of CCD's or other detecting elements can be used in the array associated with this line scanning system as desired for particular applications. A band-pass filter is also used in the line scanning embodiments, and the filter can be located on the phosphor screen 52 (not shown), or employed as individual filter elements 59 on the five CCD's indicated at 56.

The operation of the line scanning embodiments will be similar to that described above for the area-scanning embodiments. In general, an X-ray pattern will be absorbed onto phosphor screen 52 where it will be stored until illumination from a light source. The phosphor screen is then illuminated by an injection of 1060 nm light 57 through projecting fiber optic sheet 54 which impinges upon the screen 52 one line at a time, stimulating fluorescence of each line of the stored image at 560 nm. This fluoresced light is received one line at a time by receiving fiber optic sheet 58 which focuses the light upon the CCD array 56 where it is detected and digitized for processing into an image. This line scanning procedure will be repeated for each line of pixels in a particular screen, e.g., repeated 512 times for an area detector which has 512 (wide) by 512 (high) pixels. Each CCD array in the line scanning embodiments represent a linear array which is approximately one inch long with a pixel size of the desired resolution.

Figure 8:
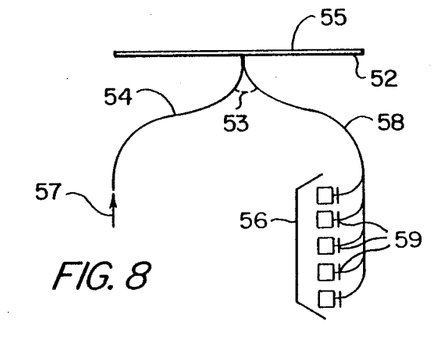
FIG. 8 is a top view of a reflection line-scanning embodiment of the present invention.
Figure 9:
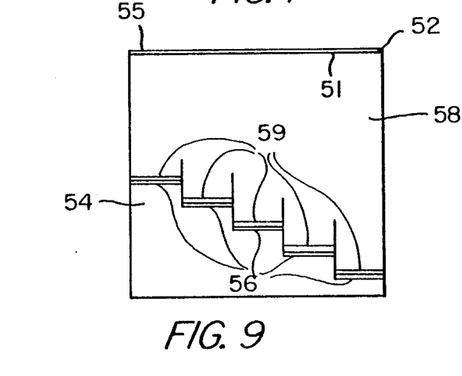
FIG. 9 is a side view of FIG. 8.

It is also possible to construct line scanning embodiments in accordance with the present invention in which the fiber optic light source is on the same side of the phosphor screen as the CCD array. These "reflection" embodiments can be observed in FIGS. 8–13. In the basic embodiment, shown in FIGS. 8–9, the projecting fiber optics sheet 54 is on the same side of screen 52 as detector array 56, and forms a small angle 53 between itself and receiving fiber optics sheet 58 near the phosphor screen. This small angle 53 between the optic sheets is highly desirable in that it reduces the stimulation of adjacent phosphors which, when detected, tend to lower overall resolution of the image. This angle 53 should be roughly from about 10 to about 30 degrees, and preferably about 20 degrees. In this embodiment, a beryllium or mylar sheet 55 is employed with phosphor screen 52, and the layer 51 of phosphor is located on the side of screen 52 facing the detector array 56. Filters 59 allowing transmission of 400–600 nm light are attached to the individual detectors of CCD array 56.

Figure 10:
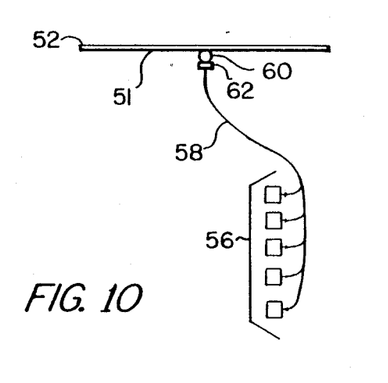
FIG. 10 is a top view of an alternative embodiment of FIG. 8.
Figure 11:
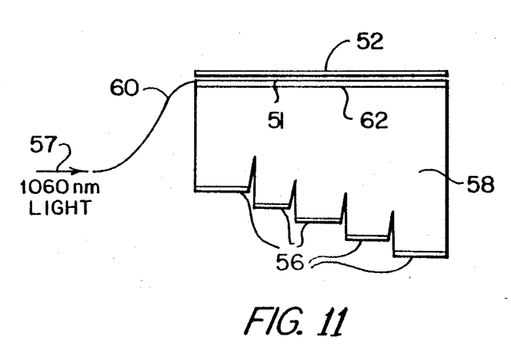
FIG. 11 is a side view of FIG. 10.

A second line scanning reflection embodiment is depicted in FIGS. 10 and 11 wherein the light source comprises one optical fiber 60 which is perpendicular to the ends of the fibers in the receiving fiber optics sheet 58. The light is injected into the fiber 60 and will be emitted from flat surfaces on the sides of the fiber facing the phosphor layer 51 on screen 52 and the receiving optics sheet 58. It is preferred that a filter element 62 be disposed between fiber 60 and receiving sheet 58 so that the fiber optic sheet 58 will pass only the fluoresced (560 nm) light, and not the injected (1060 nm) light to the CCD array.

Figure 12:
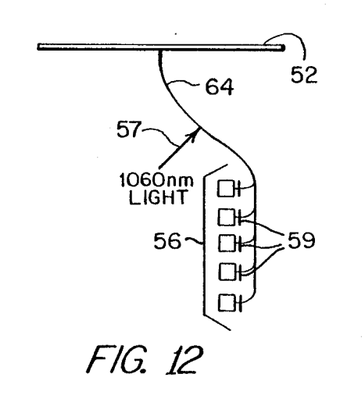
FIG. 12 is a top view of a second alternative embodiment of FIG. 8.
Figure 13:
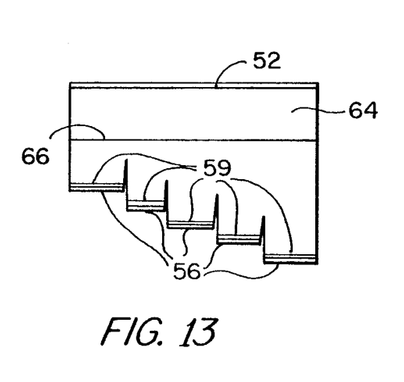
FIG. 13 is a side view of FIG. 12.

Still another embodiment of the invention is depicted in FIGS. 12 and 13. In this embodiment, only one fiber optics sheet 64 is used on the side of phosphor screen 52 closest to the CCD array 56. This fiber optics sheet 64 is characterized by an etched or machined surface 66 on the side of sheet 64. The light 57 illuminating the phosphor screen is injected in this embodiment through the etched surface 66 (as observed in FIG. 13) on the side of the fiber optics sheet, and the fluoresced light from screen 52 is transmitted back to the CCD array 56 by means of the fiber optics sheet 64. Band-pass filters 59 are employed in this embodiment, and they are preferably attached to the CCD's of array 56. In this configuration, the end of the flexible fiber optics sheet 64 is allowed to be closer to the phosphor layer than in other embodiments since reflection embodiments generally have required the light insertion fiber to be between the phosphor and the end of the fiber optics sheet transmitting the fluoresced light, and the linear scan transmission embodiments have a phosphor layer on the opposite side of the imaging plate having a thickness greater than the distance between the phosphor and the end of the receiving fiber optics sheet. As a result, this configuration should produce the highest resolution of the line-scan embodiments because of the inherent characteristic of optical fibers known as the minimum acceptance angle for light, as discussed earlier. The closer the optical fibers can be placed to the phosphors, the less light they will detect from adjacent phosphors. In addition, detector efficiency is maximized in this setup because loss of 560 nm fluoresced light at the edges of the fiber optic sheet is minimized.

Figure 14:
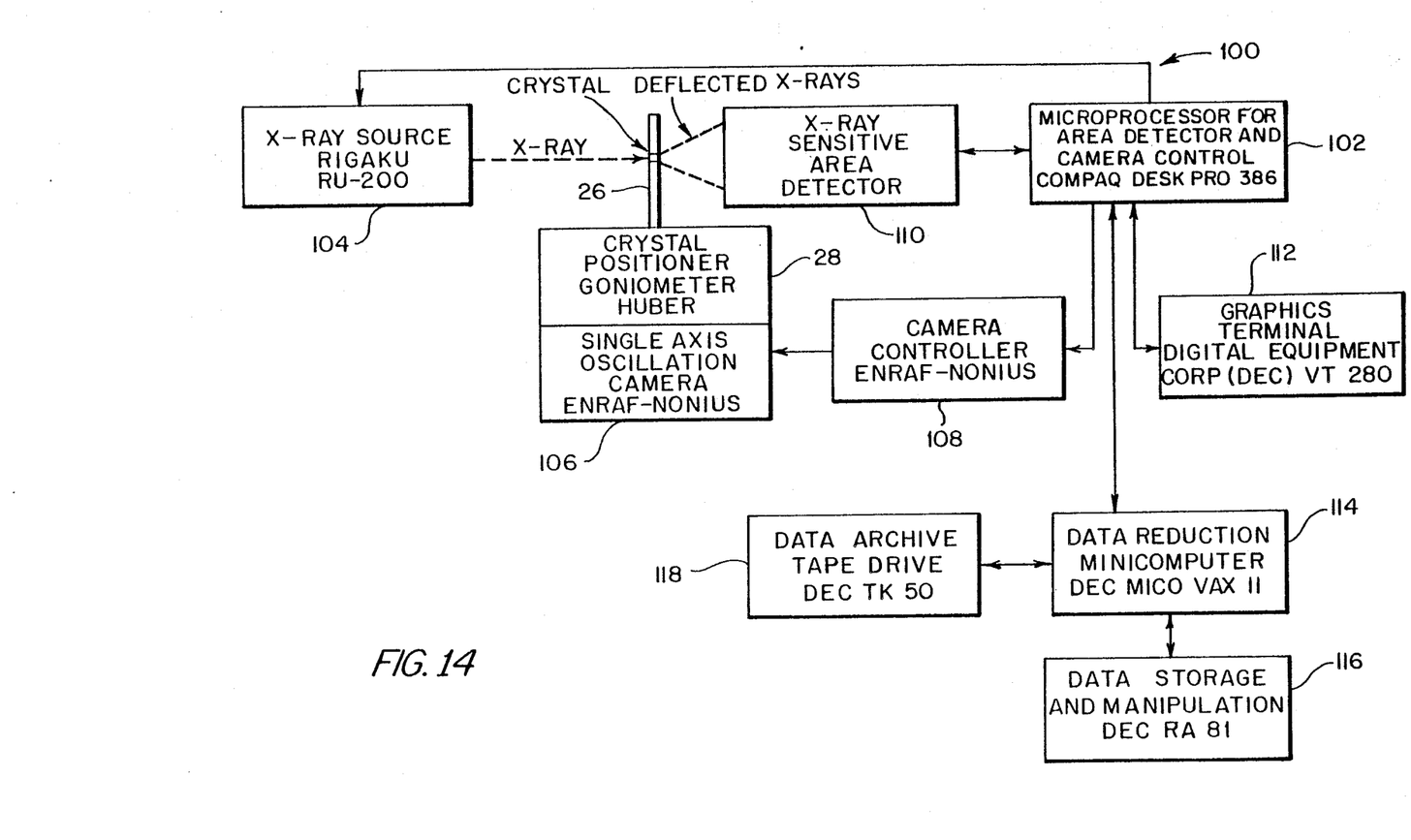
FIG. 14 is a schematic overview of the processing and the storing of an image using an apparatus of the present invention.

Signal processing from the area detection devices of the present invention can be accomplished by means of any suitable recording and data processing systems known to gather digitized data. A preferred scheme for carrying out area detection using an apparatus of the invention is depicted schematically in FIG. 14. Although there will be a number of ways of processing or visualizing the data produced in X-ray sensitive imaging, one such preferred system 100 employs a microprocessor 102 for controlling the X-ray source 104 (e.g., a Rigaku RU-200) and an oscillation camera 106 and camera controller 108 (both by Enraf-Nonius). A Compaq Desk Pro 386 microprocessor has been used successfully with the detector 110, but any compatible microprocessing equipment can be used in the invention. It is preferred to have signals received by a graphics terminal or station 112 (such as Digital VT 280) in order to visualize images from the detector when necessary. The digitized data from detector 110 is received and stored using a minicomputer 114 and storage means 116, wherein the data is placed on recording media such a magnetic tape for further analysis. If so desired, the tapes, disks, etc. of recorded information can be placed in data archive means 118, such as a Digital TK 50 Tape Drive. Using systems such as the above, one will be able to successfully employ the phosphor-film area detection devices of the present invention to obtain high resolution near real time X-ray or UV images of a variety of sample materials, including those which deteriorate rapidly.

What is claimed is:

1. A radiation sensitive area detection device for use in conjunction with an X-ray, UV, or other radiation source comprising:

a phosphor-containing film capable of receiving and storing an image formed by the pattern of incoming radiation falling on the film after deflection or transmission through a sample, and capable of fluorescing in response to a stimulation of said film by light or other electromagnetic wave, said fluorescence from said film being directly proportional to the stored image formed by the incoming radiation;

a light source capable of projecting light or other electromagnetic wave upon said phosphor-containing film so as to cause said film to fluoresce in direct proportion to the image formed by the pattern of incoming radiation stored by the film;

means for focusing the fluoresced light produced by the phosphor-containing film in response to the stimulation of said film by the light source so that said fluoresced light can be received by a detecting element, said focusing means selected from the group consisting of a lens, an optical fiber bundle in the shape of a half of an hourglass, and a combination of the above; and at least one detecting element capable of receiving and digitizing the fluoresced light produced by the phosphor-containing film in response to the stimulation of said film by a light source so as to allow detection of the image formed by the pattern of incoming radiation falling on said film after deflection or transmission through a sample.

2. A detection device according to claim 1 wherein the detecting element comprises a charged coupled detector.

3. A detection device according to claim 1 wherein the light source is capable of projecting light at a wavelength of approximately 1060 nm onto said phosphor-containing film.

4. A detection device according to claim 1 wherein the phosphor-containing film contains a barium fluorohalide phosphor.

5. A detection device according to claim 4 wherein the phosphor is selected from the group consisting of $BaFBr:Eu^{2+}$ and $BaFCl$.

6. A detection device according to claim 1 wherein the phosphor-containing film contains a phosphor selected from the group consisting of lanthanum-based compounds and sodium iodide.

7. A detection device according to claim 1 wherein the phosphor-containing film fluoresces light at a wavelength of approximately 560 nm.

8. A detection device according to claim 1 wherein the phosphor-containing film fluoresces light at a wavelength of approximately 400 nm.

9. A detection device according to claim 1 wherein the light source and the detecting element are positioned on opposite sides of the phosphor-containing film.

10. A detection device according to claim 9 further comprising a window positioned between the radiation source and the phosphor-containing film, said window being transparent to X-rays and UV radiation and opaque to visible and infrared light.

11. A detection device according to claim 10 wherein the window is comprised of beryllium.

12. A detection device according to claim 1 wherein the light source and the detecting element are positioned on the same side of the phosphor-containing film.

13. A detection device according to claim 12 wherein the phosphor-containing film is situated on a window transparent to X-rays and UV radiation and opaque to visible and infrared light.

14. A detection device according to claim 1 wherein the light source is projected directly upon the phosphor-containing film.

15. A detection device according to claim 1 wherein the light source is projected upon the phosphor-containing film by means of a mirror.

16. A detection device according to claim 15 wherein the mirror reflects infrared light and is transparent to visible light.

17. A detection device according to claim 1 further comprising at least one band-pass filter positioned in front of the charged coupled detecting element.

18. A detection device according to claim 17 wherein the band-pass filter is comprised of glass, plastic, or other transparent material.

19. A detection device according to claim 16 wherein the band-pass filter allows transmission of light at wavelengths from about 400 to about 600 nm.

20. A detection device according to claim 1 wherein the light source comprises light projected upon the phosphor-containing film by means of a fiber optic sheet.

21. A detection device according to claim 1 wherein an array comprising a plurality of detecting elements is employed.

22. A detection device according to claim 21 wherein an array comprising five detecting elements is employed.

23. A detection device according to claim 12 wherein the light source comprises light projected upon the phosphor-containing film by means of a first fiber optic sheet, wherein the focusing means comprises a second fiber optic sheet extending from the phosphor-containing film to at least one detecting element, and wherein the angle between the first and second fiber optic sheets is from about 10 to about 30 degrees.

24. A detection device according to claim 1 wherein the light source comprises light injected through a single optical fiber.

25. A detection device according to claim 1 wherein the light source comprises light injected through an etched surface of a fiber optics sheet.

26. A method of obtaining an image of the diffraction pattern caused by directing radiation through a sample comprising the steps of:
  (a) directing radiation through a sample so that a radiation diffraction pattern from the sample falls upon a phosphor-containing film capable of retaining the image of the diffraction pattern and capable of fluorescing in response to a stimulation by light or other electromagnetic wave;
  (b) illuminating the phosphor-containing film with a suitable source of light or other electromagnetic wave so that fluorescence of the image retained by the phosphor-containing film will occur; and
  (c) using a focusing means selected from the group consisting of a lens, an optical fiber bundle in the shape of a half of an hourglass, and a combination of the above to focus the fluoresced light from the phosphor-containing film onto a detecting element capable of receiving and digitizing the fluoresced light so as to allow detection of the radiation-produced image falling on the film after radiation is directed through the sample.

27. A method according to claim 26 wherein the radiation directed through the sample is X-ray or UV radiation.

28. A method according to claim 26 wherein the sample is a crystal.

29. A method according to claim 26 wherein the light or other electromagnetic wave used to illuminate the phosphor-containing film has a wavelength of approximately 1060 nm.

30. A method according to claim 26 wherein the phosphor-containing film contains a barium fluorohalide phosphor.

31. A method according to claim 26 wherein the light source illuminating the phosphor-containing film and the detecting element receiving the fluoresced light from the film are positioned on opposite sides of the film.

32. A method according to claim 31 wherein the radiation directed onto the phosphor-containing film is directed through a window transparent to the radiation and opaque to visible and infrared light before arriving at the phosphor-containing film.

33. A method according to claim 26 wherein the light source and the detecting element are positioned on the same side of the phosphor-containing film.

34. A method according to claim 26 wherein a charged coupled detector is used as the detecting element.

35. A method according to claim 26 wherein the source of light illuminating the phosphor-containing film is projected upon the film by means of a mirror.

36. A method according to claim 35 wherein the light is projected upon the film by means of a mirror which reflects infrared light and is transparent to visible light.

37. A method according to claim 26 wherein the light illuminating the phosphor-containing film is projected onto the film through a fiber optic sheet.

38. A method according to claim 26 wherein the light illuminating the phosphor-containing film is projected onto the film through a single optical fiber.

39. A method according to claim 26 wherein the light illuminating the phosphor-containing film is projected onto the film through an etched surface of a fiber optic sheet.

* * * * *